(12) United States Patent
Funnell

(10) Patent No.: US 12,399,899 B1
(45) Date of Patent: Aug. 26, 2025

(54) OPTIMIZING AND TUNING UNSTRUCTURED TEXT RECORD LINKAGE USING GENERATIVE AI DRIVEN FUZZY MATCHING

(71) Applicant: Matillion Limited, Salford (GB)

(72) Inventor: Ian Clive Funnell, Leeds (GB)

(73) Assignee: Matillion Limited, Salford (GB)

( * ) Notice: Subject to any disclaimer, the term of this patent is extended or adjusted under 35 U.S.C. 154(b) by 0 days.

(21) Appl. No.: 19/224,166

(22) Filed: May 30, 2025

(51) Int. Cl.
G06F 16/00 (2019.01)
G06F 16/2455 (2019.01)
G06F 16/9035 (2019.01)

(52) U.S. Cl.
CPC ...... *G06F 16/2456* (2019.01); *G06F 16/9035* (2019.01)

(58) Field of Classification Search
CPC .................................................. G06F 16/9035
See application file for complete search history.

(56) References Cited

U.S. PATENT DOCUMENTS

| | | |
|---|---|---|
| 7,296,011 B2 | 11/2007 | Chaudhuri et al. |
| 7,702,631 B1 | 4/2010 | Basu et al. |
| 10,586,532 B1 | 3/2020 | Cavallo et al. |
| 11,461,687 B1 | 10/2022 | Shaikh et al. |
| 11,720,580 B1 | 8/2023 | Hirsch et al. |
| 2003/0078899 A1 | 4/2003 | Shanahan |
| 2008/0025596 A1 | 1/2008 | Podilchuk |
| 2011/0238659 A1 | 9/2011 | Chittar et al. |
| 2015/0186502 A1 | 7/2015 | Kassa |
| 2017/0103110 A1 | 4/2017 | Winstanley |
| 2017/0371934 A1 | 12/2017 | Kenshalo, III |
| 2018/0053096 A1 | 2/2018 | Farrell et al. |
| 2018/0121520 A1 | 5/2018 | Degiere et al. |
| 2020/0278964 A1 | 9/2020 | Bjelland et al. |
| 2020/0401587 A1 | 12/2020 | Jagota |
| 2021/0248446 A1 | 8/2021 | Hughes et al. |
| 2022/0229990 A1* | 7/2022 | Turkkan ................. G06N 5/022 |
| 2022/0318504 A1 | 10/2022 | Malkiel et al. |
| 2022/0382980 A1 | 12/2022 | Klein |
| 2024/0062099 A1 | 2/2024 | Crockett et al. |
| 2024/0311389 A1 | 9/2024 | Karabatis et al. |

OTHER PUBLICATIONS

Li, et al., "Auto-FuzzyJoin: Auto-Program Fuzzy Similarity Joins Without Labeled Examples", SIGMOD '21: Proceedings of the 2021 International Conference on Management of Data, 16 pages, Jun. 18, 2021, <https://doi.org/10.1145/3448016.3452824>.

* cited by examiner

*Primary Examiner* — Ajith Jacob
(74) *Attorney, Agent, or Firm* — Gilliam IP PLLC

(57) ABSTRACT

An AI-powered fuzzy join technique has been created to efficiently join records/entries of datasets based on fuzzy matching of string keys. A small language model (SLM) is prompted to generate a set of abbreviations for each string key of the datasets being joined. Records of the datasets are joined based on pairing or matching string keys with overlapping abbreviations. The SLM or a LLM is prompted to score the similarity between string keys having the overlapping abbreviations. The joined dataset can be refined or filtered based on the similarity scores.

21 Claims, 8 Drawing Sheets

OPTIMIZING AND TUNING UNSTRUCTURED TEXT RECORD LINKAGE USING GENERATIVE AI DRIVEN FUZZY MATCHING

BACKGROUND

The disclosure generally relates to joining datasets of strings based on fuzzy matching strings between datasets (e.g., CPC class G06F 16).

Fuzzy joining joins or merges data on a join key(s) using a fuzzy matching algorithm that approximates matches of join key values rather than exact matches. Fuzzy joining can be used to enrich a first party dataset with an external dataset despite inaccuracies or inconsistences between the datasets. The fuzzy matching algorithms used in fuzzy joins include those that use pattern or regular expression matching, phonetic matching, token-based matching, and distance-based matching. A distance-based matching algorithm measures distance between strings, such as edit distance. Types of edit distance include Levenshtein distance, Hamming distance, Longest Common Subsequence distance, and Jaro distance.

BRIEF DESCRIPTION OF THE DRAWINGS

Embodiments of the disclosure may be better understood by referencing the accompanying drawings.

DESCRIPTION

Figure 1:
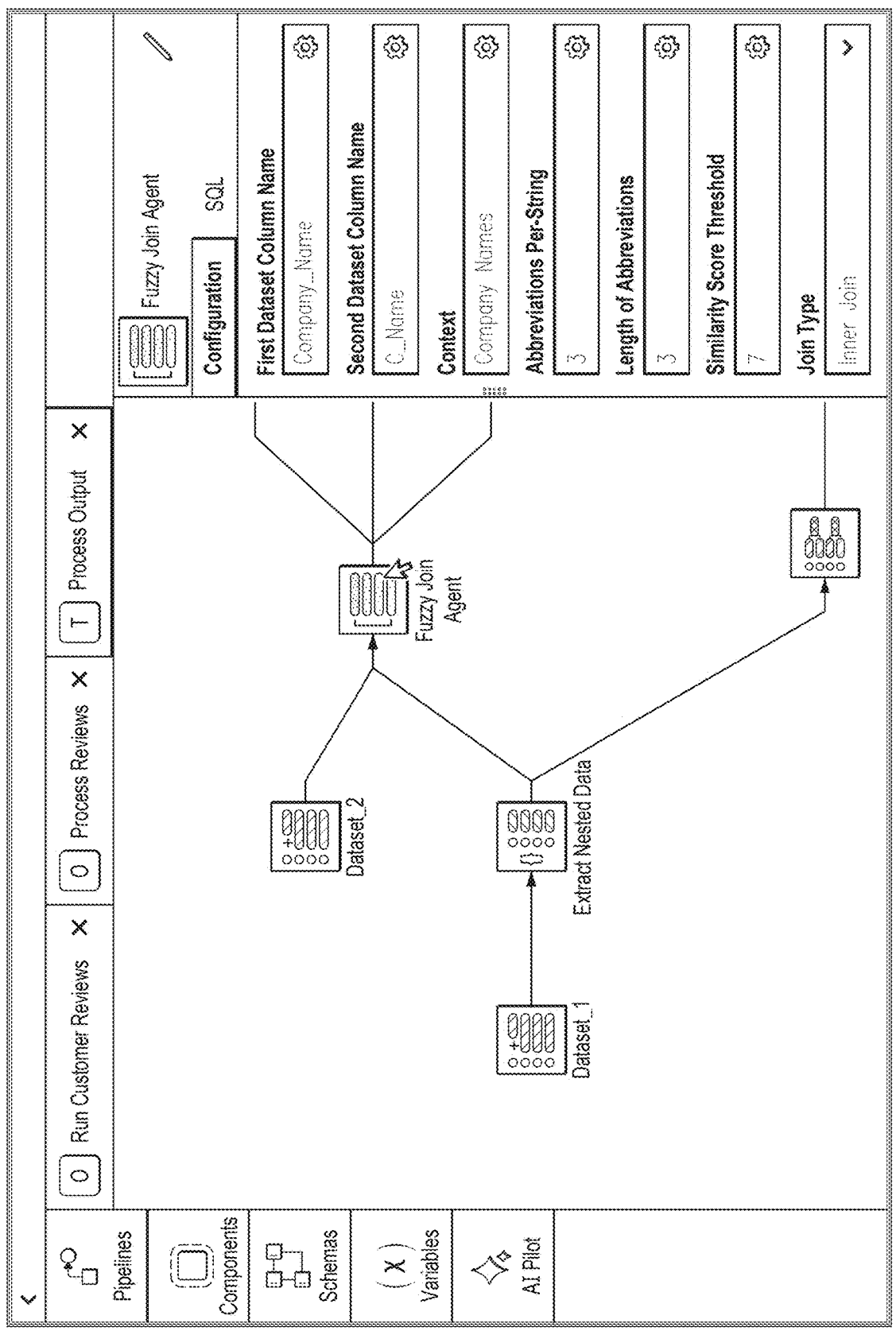
FIG. 1 is an illustration of an example pipeline orchestration interface with a transformation pipeline that includes an AI-powered fuzzy join agent.

The description that follows includes example systems, methods, techniques, and program flows to aid in understanding the disclosure and not to limit claim scope. Well-known instruction instances, protocols, structures, and techniques have not been shown in detail for conciseness.

Terminology

A "prompt" refers to input to a foundation model or artificial intelligence (AI) model, and prompting refers to the act of submitting a prompt to a model to perform inference based on the submitted prompt. Foundation models and AI models include generative AI models, such as language models. A prompt at least includes a task for the model and one or more instructions for the task in natural language. A prompt can also include context, constraints, and examples. In other words, a prompt is a natural language task instruction(s) and other information that can assist the model in performing the task successfully. A prompt can have more than one task instruction and prompts can be chained to incorporate responses from the model into a subsequent prompt. A prompt can be entered by a user and/or constructed from a prompt template by a prompt generator.

The description uses the term "string keys" to refer to strings within a dataset that are used to join or merge records of the dataset with one or more additional datasets. In terms of tables, a join key is the column which includes the strings which are used to join records of datasets. The values (i.e., strings) of the join key are the string keys. In terms of datasets not stored as tables, a specified field or variable is a string type which is common across records, objects, or entries of the datasets and can be used as a join/merge key. Thus, the values of that field/variable are the string keys.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

An AI-powered fuzzy join technique has been created to efficiently join records/entries of datasets based on fuzzy matching of string keys. The disclosed fuzzy join of datasets prompts a generative AI model (e.g., a small language model) to generate a set of abbreviations for each string key of the datasets being joined. The fuzzy join technique joins records of the datasets based on pairing or matching string keys with overlapping/intersecting abbreviations. This yields a joined dataset with string keys deemed to match based on overlapping/intersecting abbreviations. Similarity measurements are then applied to refine the joined dataset to those with sufficient similarity for the join. The fuzzy join technique prompts a large language model (LLM) to score the similarity between string keys for each record in the joined dataset having the overlapping abbreviations. Based on the similarity scores, the fuzzy joining technique filters records from the joined dataset which do not have sufficient similarity. The disclosed fuzzy joining technique achieves the join faster than $O(n^2)$ complexity. By fuzzy matching strings based on their abbreviated versions, the disclosed fuzzy join technique reduces the resources for determining semantic similarity by limiting the semantic analysis to those strings with overlapping abbreviations. Additionally, the disclosed fuzzy join technique offers a higher level of precision when compared to techniques which simply prompt generative AI models to join datasets. By filtering out string keys which do not warrant AI resources for similarity comparison, the disclosed fuzzy join focuses the analysis performed by the LLM on those string keys which have a high chance of being semantically equivalent to string keys in the other dataset, thereby reducing the chance of errors by the LLM.

Example Illustrations

FIG. 1 is an illustration of an example pipeline orchestration interface with a transformation pipeline that includes an AI-powered fuzzy join agent. The pipeline orchestration interface includes a pipeline or job canvas, a configuration panel for the fuzzy join agent to the right of the pipeline canvas, tabs for jobs or pipelines created by a user of the pipeline orchestration interface at the top of the pipeline canvas, and a control panel to the left of the pipeline canvas. The tab furthest to the right on the pipeline canvas, labeled "Process Output", is depicted with a darkened outline to represent that the "Process Output" pipeline was selected by a user. The remaining tabs, "Run Customer Reviews" and "Process Reviews," are unselected. The pipeline canvas includes several components of the "Process Output" pipeline, including two dataset components labeled "Dataset_1" and "Dataset_2" respectively, a fuzzy join agent component, and a data preprocessing component labeled "Extract Nested Data". Both dataset components are connected as inputs into the fuzzy join agent component. The dataset component labeled "Dataset_1" is connected to the fuzzy join agent component through the data preprocessing component, illustrating that the data preprocessing component extracts nested data from "Dataset_1" and sends the nested data to the fuzzy join agent component. The configuration panel indicates multiple fields which indicate values which are used at various stages of the fuzzy join. The fields are labeled: "First Dataset Column Name", "Second Dataset Column Name", "Context", "Abbreviations Per-String", "Length of Abbreviations", "Similarity Score Threshold", and "Join Type". Each field has a cog button next to the fields to show the values inside each field are modifiable. The field "Join Type" is depicted with a dropdown menu to allow a user to select a join type for the fuzzy join agent component to perform. The pipeline canvas also depicts three lines output from the fuzzy join agent component to represent the output of the fuzzy join (i.e., a fuzzy joined dataset) are sent to three downstream pipeline components (not depicted).

Figure 2:
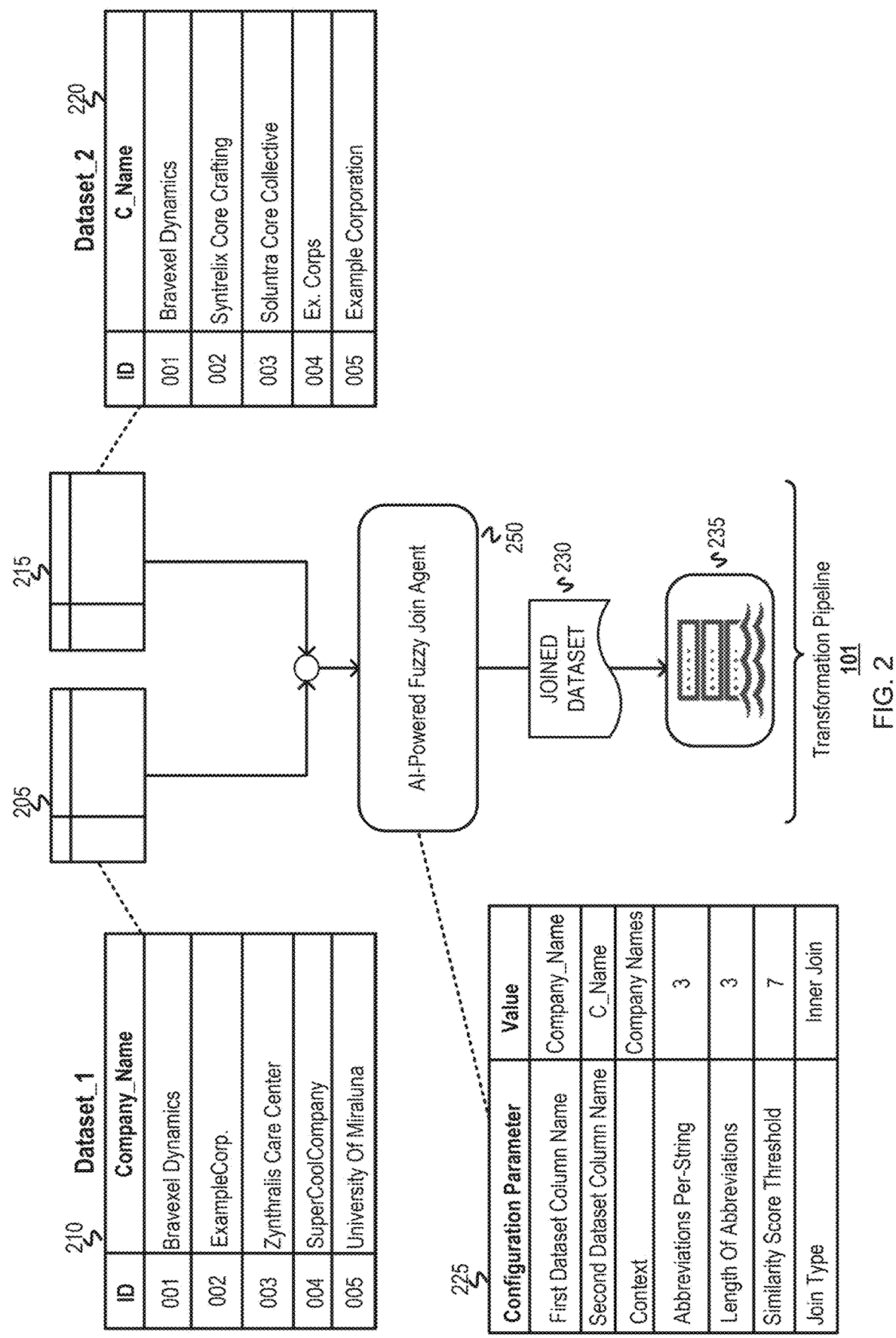
FIG. 2 is a diagram of a transformation pipeline which performs an AI-powered fuzzy join on datasets with string keys.

FIG. 2 is a diagram of a transformation pipeline which performs an AI-powered fuzzy join on datasets with string keys. A transformation pipeline 201 (sometimes referred to as a data pipeline) includes dataset nodes 205, 215 which correspond to a dataset 210 and a dataset 220, respectively. The dataset 210 is labeled "Dataset_1" and has a column "Company_Name" which indicates a list of string keys for Dataset_1 210. The dataset 220 is labeled "Dataset_2" and has a column "C_Name" which indicates a list of strings for Dataset_2 220. FIG. 1 also depicts an AI-powered fuzzy join agent 250 ("fuzzy join agent"). The transformation pipeline 101 connects Dataset_1 210 and Dataset_2 220 as inputs to the AI-powered fuzzy join agent 250. The fuzzy join agent 250 is configured with a fuzzy join configuration 225 that includes multiple configurable parameters. A user can interact with the pipeline orchestration interface to set the values of the parameters of the fuzzy join configuration 225.

The fuzzy join configuration 225 includes fields "First Dataset Column Name", "Second Dataset Column Name", "Context", "Abbreviations Per-String", "Length Of Abbreviations", "Similarity Score Threshold" and "Join Type". The "First Dataset Column Name" field indicates the value "Company_Name", assigning the "Company_Name" column to be the join key for Dataset_1 210. The "Second Dataset Column Name" field indicates the value "C_Name", assigning the "C_Name" column to be the join key for Dataset_2 220. The "Context" field specifies a context for the string keys in both of the datasets 210, 220. A context refers to an identifier type (e.g., usernames, company names or addresses). The context for the datasets 210, 220, identified as datasets Dataset_01 and Dataset_02, is "Company Names". The context is used to guide a generative AI model (not depicted) when generating the abbreviations for string keys in the datasets. The "Abbreviations Per-String" field specifies the number of abbreviations the generative AI model should generate for each string key in the datasets 210, 220. The "Length Of Abbreviations" field specifies the number of characters for each abbreviation. The "Similarity Score Threshold" field specifies the threshold value for evaluating whether measured similarity is sufficient. The "Join Type" field specifies the type of join being performed on the datasets (e.g., inner join or left outer join). Although not depicted in FIG. 1, the fuzzy join configuration 225 can include a field which allows a user to specify a generative AI model(s) for the transformation pipeline 201 to use when generating abbreviations and similarity scores as part of the fuzzy joining.

Figure 3:
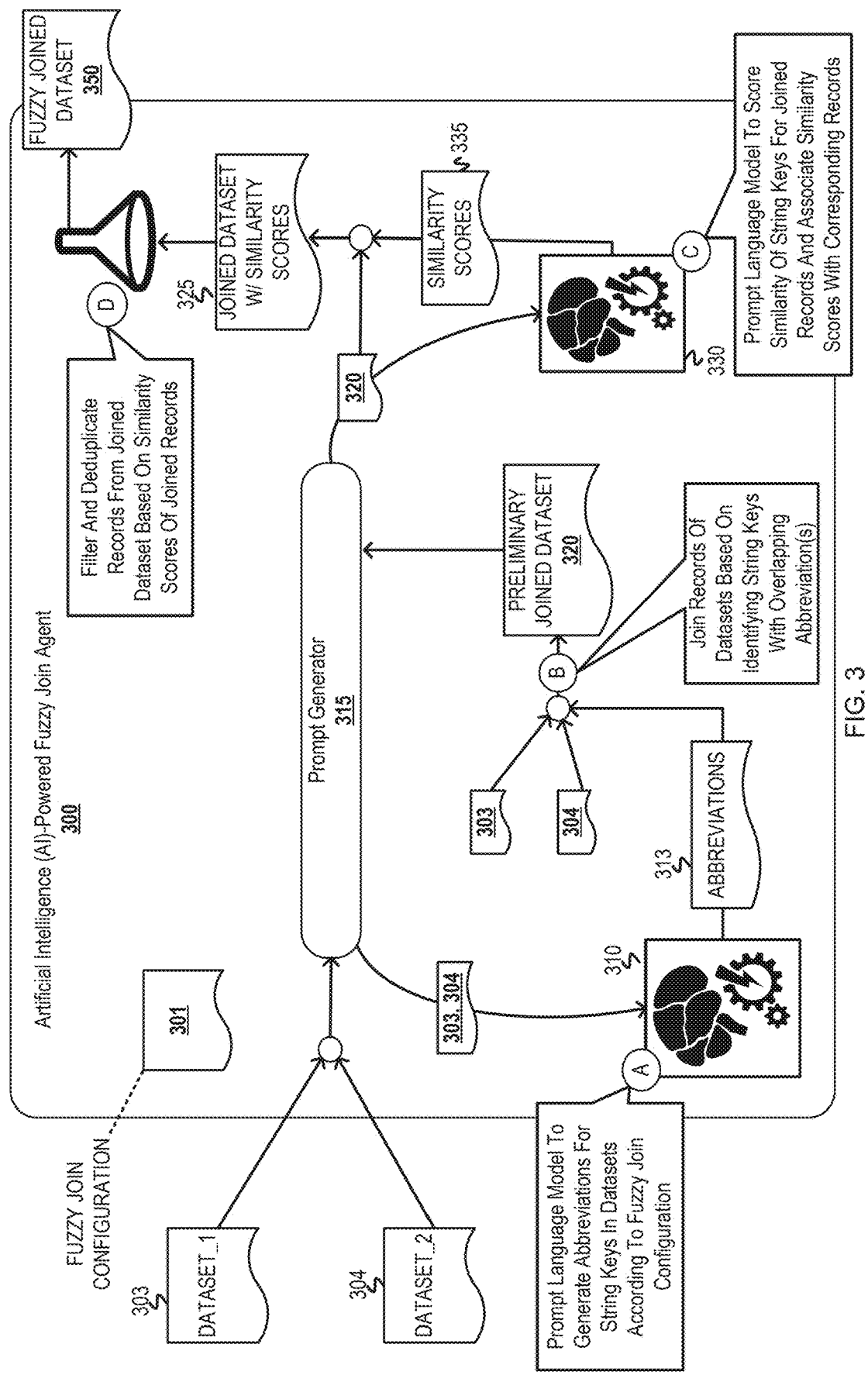
FIG. 3 is a diagram of an AI-powered fuzzy join agent performing the AI powered fuzzy join on datasets with string keys.

The fuzzy join agent 250, when the transformation pipeline 201 is run, joins records of the datasets 210, 220 based on the join type indicated in the configuration 225. FIG. 3 elaborates further on the operations executed by the fuzzy join agent 250 to perform the fuzzy join. FIG. 2 depicts the joined dataset 230 which is generated based on running the transformation pipeline 201. After joining records of the datasets 210, 220, the transformation pipeline 201 stores the joined dataset 230 in a data lake 235. In some configurations of the transformation pipeline 201, the joined dataset 230 may be sent to a downstream service or pipeline which performs additional analysis or transformations on the joined dataset 230.

Figure 4:
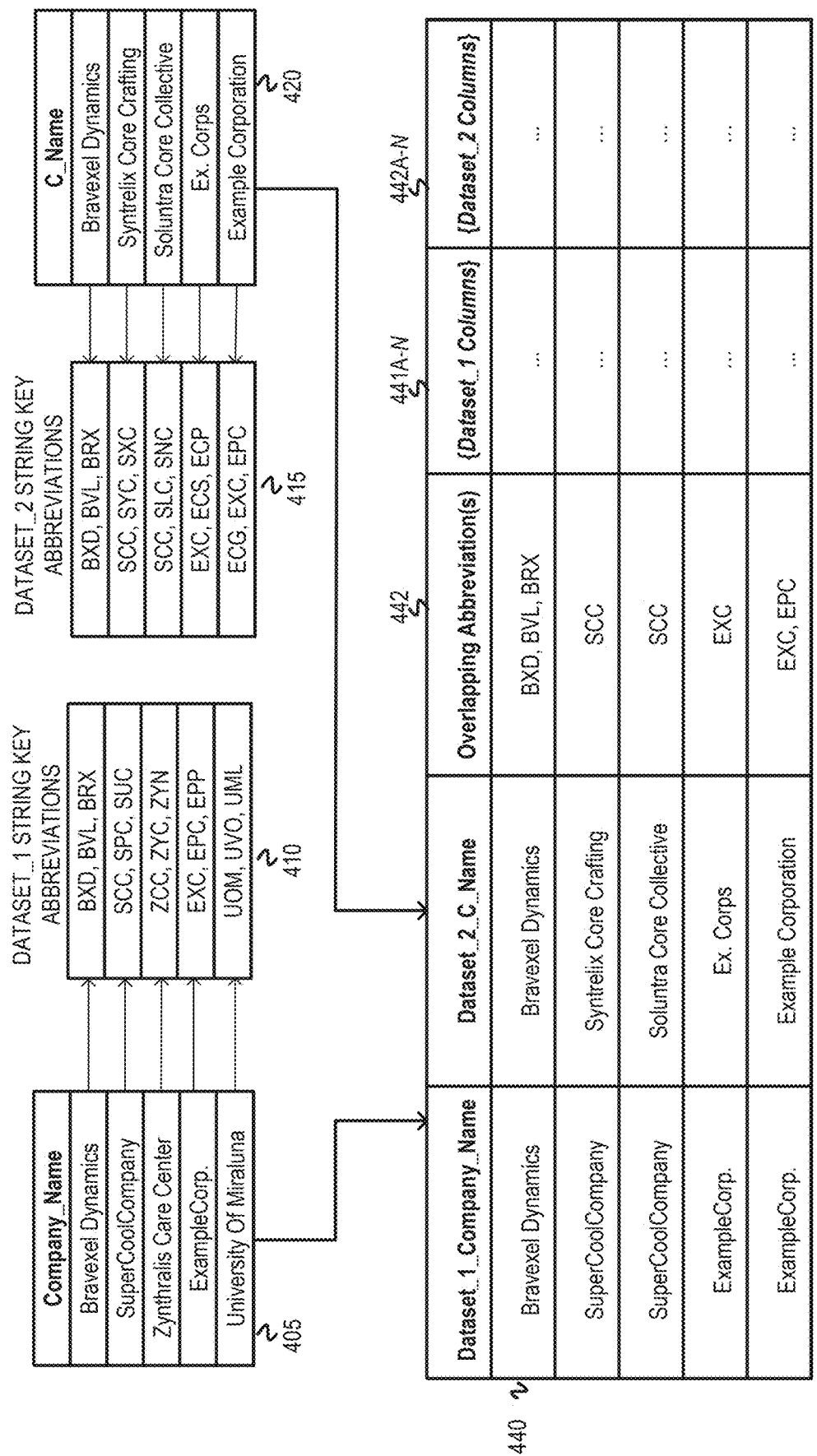
FIG. 4 is a diagram of string keys and abbreviations mappings.

FIG. 3 is a diagram of an AI-powered fuzzy join agent performing the AI powered fuzzy join on datasets with string keys. FIG. 4 is described in tandem with FIG. 3 to aid in explaining FIG. 3. FIG. 4 is a diagram of string keys and string keys matched or paired based on overlapping/intersecting abbreviations. FIG. 3 depicts datasets 303, 304 labeled "Dataset_1" and "Dataset_2", respectively. FIG. 3 also depicts an AI-powered fuzzy join agent 300 ("fuzzy join agent"), a first language model 310, and a second language model 330. The fuzzy join agent 300 includes a prompt generator 315. The fuzzy join agent 300 also includes or has access to a fuzzy join configuration 301 which includes parameters used at various stages of the fuzzy joining, an example of which was depicted in FIG. 1. The values of the parameters of the fuzzy join configuration 301 can be user provided values and/or default values determined based on content or familiarity with the content of the datasets 303, 304 being joined.

FIG. 3 is annotated with a series of letters A-D representing stages of operations, each stage corresponding to one or more operations. Although these stages are ordered for this example, the stages illustrate one example to aid in understanding this disclosure and should not be used to limit the claims. Subject matter falling within the scope of the claims can vary from what is illustrated.

At stage A, the fuzzy join agent 300 prompts the first language model 310 to generate abbreviations for string keys in the datasets 303, 304 according to the fuzzy join configuration 301. The fuzzy join agent 300 generates a prompt which includes the string keys for each dataset 303, 304 and task instructions to generate abbreviations for each string key in the datasets 303, 304 according to the fuzzy join configuration 301 (i.e., the value of the context field in the fuzzy join configuration 301) which includes abbreviation length and number of abbreviation parameters. The prompt also includes the context indicated in the fuzzy join configuration 301 to guide the first language model 310 when generating the abbreviations. The first language model 310 can be a small language model (i.e., a language model with fewer parameters than a large language model). Examples of small language models include Phi 3.5, the StableLM®-zephyr language model, Gemma2, and Qwen2. For the purposes of explaining the operations below, the context defined by the fuzzy join configuration 301 is "Company Names". The fuzzy join agent 300 sends the generated prompt to the first language model 310 and receives a response 313 that includes the abbreviations generated for each string key in the datasets 303, 304. To illustrate the correspondence between abbreviations and string keys, FIG. 4 depicts columns 405, 420 labeled "Company_Name" and "C_Name" which indicate the string keys for each of the datasets 303, 304. FIG. 4 depicts abbreviations 410 for the string keys in the "Company_Name" column 405, and abbreviations 415 for the string keys in the "C_Name" column 420. Each entry in the columns 405, 420 corresponds to a set of three abbreviations. For example, the first entry of the "Company_Name" column 405 indicates "Bravexel Dynamics". FIG. 4 depicts an arrow pointing from the entry indicating "Bravexel Dynamics" to the abbreviations: "BXD", "BVL", and "BRX".

At stage B, the fuzzy join agent 300 joins records of the datasets based on identifying string keys with overlapping abbreviation(s) between the datasets 303, 304 and generates a preliminary joined dataset 320. As an example of the preliminary joined dataset 320, FIG. 4 depicts a table 440 to illustrate how string keys between the datasets 303, 304 are mapped based on their associated abbreviations. The table 440 has columns "Dataset_1_Company_Name" and "Dataset_2_C_Name". The table 440 also has a column 442 "Overlapping Abbreviation(s)", columns 441A-N which represent the additional columns included in Dataset_1 303, and columns 442A-N which represent the additional columns included in Dataset_2 304. Each record in the table 440 indicates a pair of string keys which have at least one overlapping abbreviation. For example, the second record in the table 440 indicates the string keys "SuperCoolCompany" and "Syntrelix Core Crafting." The abbreviations 410 indicate "SuperCoolCompany" has the abbreviations "SCC, SPC and SUC" and the abbreviations 415 indicate "Syntrelix Core Crafting" has the abbreviations "SCC, SYC, and SXC". Both string keys have the abbreviation "SCC", therefore the second record in the table 440 indicates the overlapping abbreviation "SCC". The fuzzy join agent 300 can execute a structured query language (SQL) query to generate the preliminary joined dataset 320. The SQL query will perform the join type indicated by the fuzzy join configuration 301. An example SQL query which performs an inner join based on identifying string keys with overlapping abbreviations is below. The SQL query presumes each dataset has a column "abbreviations" with the abbreviations corresponding to each string key in the datasets 303, 304. The example SQL query is:

"SELECT Dataset_1.*, Dataset_2.*
NULL AS Similarity_Score
FROM Dataset_1
JOIN Dataset_2
ON cardinality(ARRAY(SELECT UNNEST (dataset_1.abbreviations) INTERSECT SELECT UNNEST(dataset_2.abbreviations)))>0".

Each entry in the preliminary joined dataset 320 indicates a company name from Dataset_1 303 and a company name from Dataset_2 304 which fuzzy matched based on having overlapping abbreviations. In some cases, the preliminary joined dataset 320 may include a column which stores the overlapping abbreviation(s). As an example, the preliminary joined dataset 320 has the below entries. Only the columns of the preliminary joined dataset 320 which correspond to the string key columns of the datasets 303, 304 and the similarity score column are depicted for simplicity.

| Dataset_1_Company_Name | Dataset_2_C_Name | Similarity_Score |
| --- | --- | --- |
| Bravexel Dynamics | Bravexel Dynamics | — |
| SuperCoolCompany | Syntrelix Core Crafting | — |
| SuperCoolCompany | Soluntra Core Collective | — |
| ExampleCorp. | Ex. Corps | — |
| ExampleCorp. | Example Corporation | — |

In some cases, the preliminary joined dataset 320 can include multiple entries which indicate the same string key. For example, the fourth and fifth entries in the preliminary joined dataset 320 above both indicate the string key "ExampleCorp." in the "Dataset_1_Company_Name" column because the string key "ExampleCorp." had overlapping abbreviation(s) with both "Ex. Corps" and "Example Corporation" as depicted in the table 440 of FIG. 4.

At stage C, the prompt generator 315 generates prompts and the fuzzy join agent 300 uses the generated prompts to prompt the second language model 330 to score the similarity of the string keys indicated in each joined record in the preliminary joined dataset 320. The prompt generator 315 generates a prompt for each record in the preliminary joined dataset 320 which corresponds to a joined record (i.e., records which indicate a string key from each of the datasets 303, 304). In cases where the join type is an inner join, every entry in the preliminary joined dataset 320 is a joined record. When a left join is performed, some records in the preliminary joined dataset 320 may only indicate a string key from one of the datasets 303, 304 based on failing to fuzzy match by abbreviation. The prompts include task instructions to generate a similarity score (e.g., a value between 0 and 10) for the string keys being evaluated. In some cases, the fuzzy join agent 300 may normalize the similarity score values received from the second language model 330. As the second language model 330 returns responses 334 with similarity scores for the qualifying records, the scores are associated to their corresponding records in the preliminary joined dataset 320 by updating the values in the "Similarity Score" column. The joined dataset 325 with similarity scores is:

| Dataset_1_Company_Name | Dataset_2_C_Name | Similarity_Score |
| --- | --- | --- |
| Bravexel Dynamics | Bravexel Dynamics | 10 |
| SuperCoolCompany | Syntrelix Core Crafting | 2 |
| SuperCoolCompany | Soluntra Core Collective | 4 |
| ExampleCorp. | Ex. Corps | 5 |
| ExampleCorp. | Example Corporation | 7 |

At stage D, the fuzzy join agent 300 filters records of the joined dataset 325 based on the associated similarity scores and deduplicates records. For example, the fuzzy join agent 300 generates an SQL query to filter records of the joined dataset 325, creating the fuzzy joined dataset 350. An example SQL query to create the fuzzy joined dataset 350 is depicted below. The SQL query presumes the joined dataset 325 is called "JoinedDataset". The SQL query is:

"SELECT JoinedDataset.*,
FROM JoinedDataset
WHERE JoinedDataset.Similarity_Score >4".

Based on executing the above SQL query, the fuzzy join agent 300 generates the fuzzy joined dataset 350. The above SQL query specifies a similarity score threshold of "4" which was determined from the fuzzy join configuration 301. In implementations where one of the datasets being joined is an authoritative dataset (i.e., the dataset has the version of the string key which will be indicated in the fuzzy joined dataset 350), the SQL query is constructed so the column which corresponds to the string keys for the authoritative dataset is included in the fuzzy joined dataset 350. In that scenario, the column which corresponds to the string keys for the non-authoritative dataset is not included in the fuzzy joined dataset 350. The fuzzy join agent 300 then deduplicates records of the joined dataset. Below is a partial representation of the fuzzy joined dataset 350 with columns which are used for deduplicating records. The fuzzy joined dataset 350 in part is:

| Dataset_1_Company_Name | Dataset_2_C_Name | Similarity Score |
| --- | --- | --- |
| ExampleCorp. | Ex. Corps | 5 |
| ExampleCorp. | Example Corporation | 7 |
| Bravexel Dynamics | Bravexel Dynamics | 10 |

A record is considered a duplicate when the record has the same string key as another record in the fuzzy joined dataset 350 in either the first dataset's string key column (e.g., Dataset_1_Company_Name), or in the second dataset's string key column (e.g., Dataset_2_C_Name). For example, the first record and the second record in the fuzzy joined dataset 350 both indicate the string "ExampleCorp." in the "Dataset_1_Company_Name" column. The fuzzy join agent 300 determines which record to keep based on determining which duplicate record has the highest similarity score. The remaining duplicate record(s) are removed from the fuzzy joined dataset 350. If multiple records in the preliminary joined dataset 320 indicate the same string key and the same high similarity score, the fuzzy join agent selects an entry to keep and discards the rest. To determine which entry to keep, the fuzzy join agent can generate and execute a SQL query such as:

"SELECT *,
ROW_NUMBER( ) OVER (PARTITION BY Dataset_1_Company_Name ORDER BY similarity_score DESCENDING)
FROM StringKeys".

The fuzzy joined dataset 350 with the deduplicated records is output from the fuzzy join agent 300 and sent to a downstream process or repository.

Figure 5:
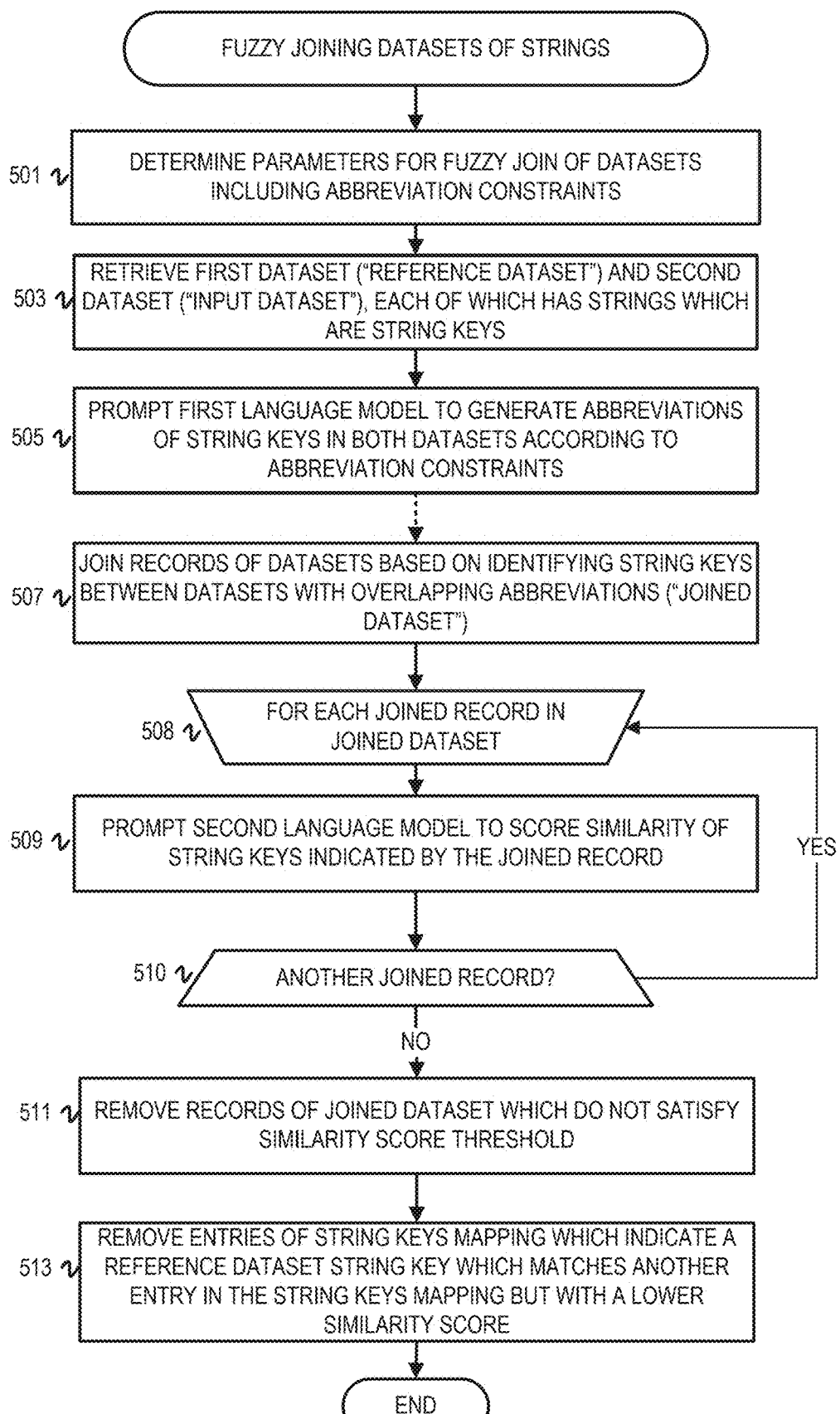
FIG. 5 is a flowchart of example operations for fuzzy joining datasets of strings based on identifying string keys between datasets which have overlapping abbreviations and filtering out joined records based on fuzzy similarity logic.
Figure 6:
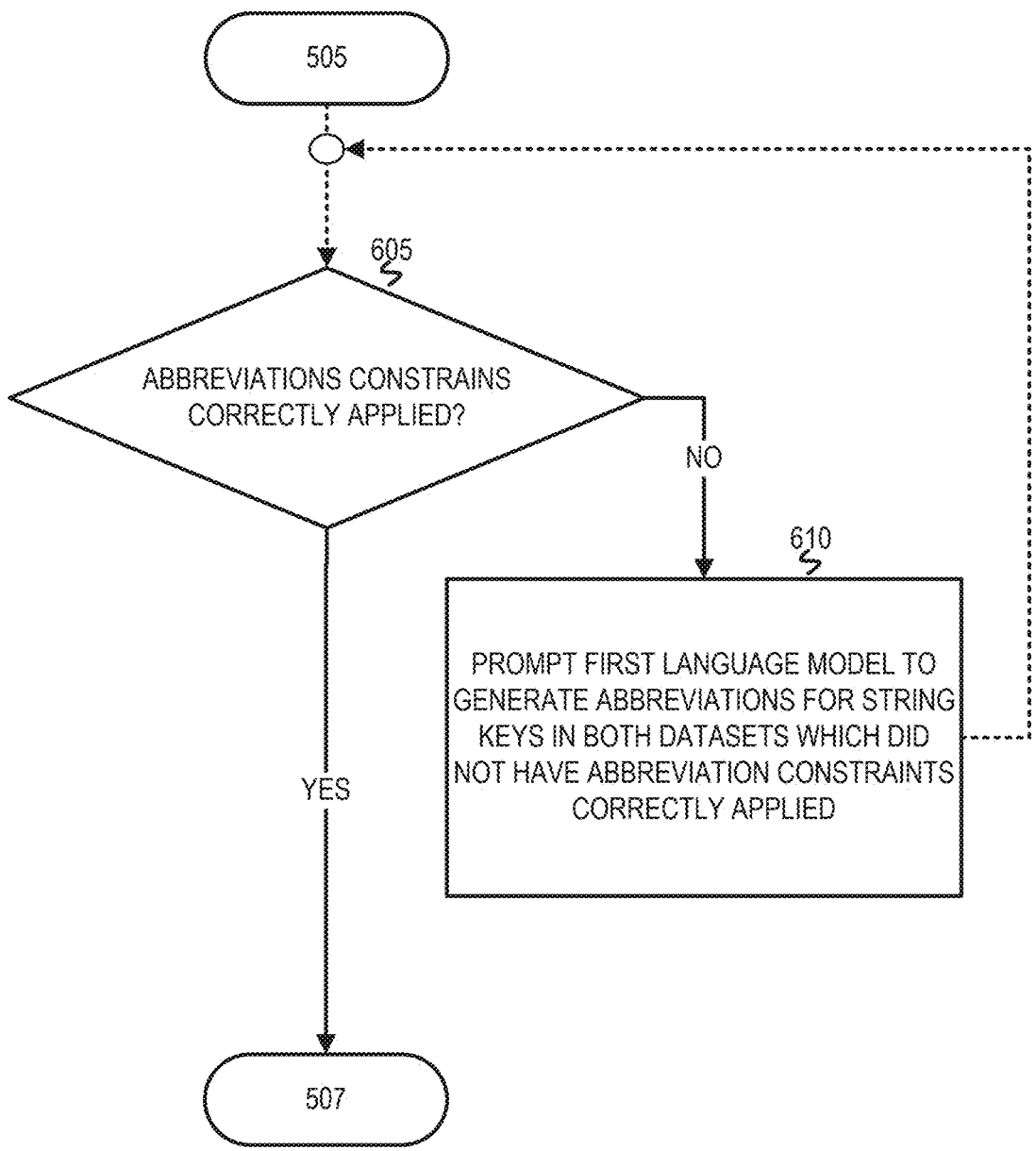
FIG. 6 is a flowchart of example operations for verifying that abbreviation constraints were correctly applied when generating abbreviations for string keys of datasets.
Figure 7:
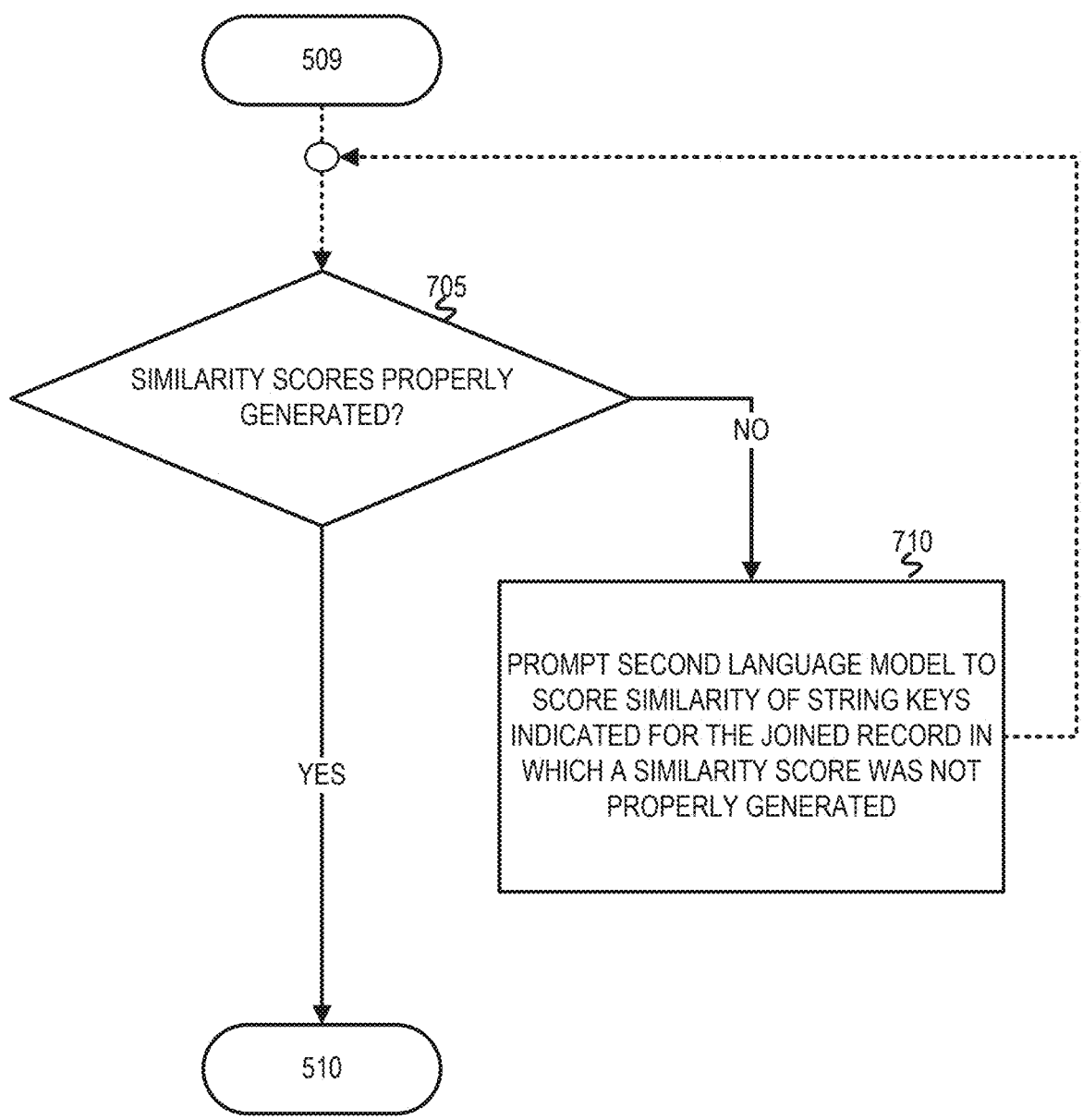
FIG. 7 is a flowchart of example operations for verifying that similarity scores were properly generated for a joined record in the joined dataset.

FIGS. 5-7 are flowcharts of example operations related to performing a join on datasets based on fuzzy matching with abbreviated versions of strings between the datasets. The example operations are described with reference to a fuzzy join agent for consistency with FIGS. 1-3 and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 5 is a flowchart of example operations for fuzzy joining datasets of strings based on identifying string keys between datasets which have overlapping abbreviations and filtering out joined records based on fuzzy similarity logic. The fuzzy joining is performed based on set configurations as stated earlier. These may be set when configuring a transformation/data pipeline. Assuming a transformation/data pipeline, the operations would execute when the data pipeline or data transformation is run.

At block 501, the fuzzy join agent determines parameters for the fuzzy joining of datasets, including abbreviation constraints from the configuration. The parameters for the fuzzy joining include: a join type, a similarity score threshold, a context, a number of abbreviations to generate for each string key in the datasets, and the abbreviation length. The fuzzy join agent may use default values for the abbreviation constraints which were determined based on experimentation involving generating abbreviations for strings with different contexts. In some cases, a user may override the default values of the abbreviation constraints based on user preference and/or knowledge of the characteristics of the strings in the datasets. The context can indicate a string type or entity type represented or indicated by the string keys. The context for the example operations described below will be company names.

At block 503, the fuzzy join agent retrieves a first dataset ("reference dataset") and a second dataset ("input dataset"), each of which have strings to be used as key values for joining/merging. If the reference dataset and input dataset are tables, the fuzzy join agent determines a column for each dataset which indicates the string keys which will be used to join records of the datasets. The column which corresponds to the string keys for each dataset can be determined from the configuration data of the fuzzy join agent. In cases where the reference dataset is an authoritative dataset, string keys indicated in the string key column of the reference dataset are the versions of the strings which are included in the joined dataset. In that scenario, the company names indicated in the input dataset are used to join records of the datasets but are not included in the joined dataset. If the fuzzy join agent is part of a transformation/data pipeline, nodes within the pipeline can include configuration data which specify an identifier or location for each of the reference and input datasets. In some cases, a transformation/data pipeline which includes the fuzzy join agent may retrieve the reference and input datasets.

At block 505, the fuzzy join agent prompts a first language model to generate abbreviations of string keys in both the reference dataset and the input dataset according to the determined abbreviation constraints. Assuming abbreviation constraints specify an abbreviation length m and quantity n, the fuzzy join agent generates a prompt to the first language model that includes task instructions to generate n abbreviations of length m for each string key in the reference dataset and input dataset. The fuzzy join agent then submits the prompt to the first language model. The abbreviations returned by the first language model are associated with their corresponding string keys. For example, a record in the reference dataset can have a string key "ExampleCorp." which has the associated abbreviations "EXC," "EPC," and "EPP." In cases where the reference dataset and input datasets are tables, a column can be added to each dataset which indicates the abbreviations. In cases where datasets are datasets of objects, a field can be added to each object in the datasets to indicate the abbreviations for the corresponding string key indicated in the string key field in each object. In cases where a dataset is a list of strings, a separate mapping of string keys to abbreviations is generated by the fuzzy join agent. Alternatively, the abbreviations can be appended to each of the string keys along with a delimiter to denote the separation between a string key and its corresponding abbreviation(s). The dashed line between blocks 505 and 507 indicates the fuzzy join agent waits for a response from the first language model before operational flow proceeds to block 507.

At block 507, the fuzzy join agent joins records of the datasets based on identifying string keys between the datasets having overlap in their generated abbreviations. The fuzzy join agent compares each set of abbreviations for each string key of the reference dataset to each set of abbreviations for each string key in the input dataset and determines pairs of string keys which have at least one abbreviation in common. If the reference dataset and input dataset are tables in a relational database, the fuzzy join agent can generate an SQL query that effects the comparisons to carry out the join. The fuzzy join agent constructs the SQL query to perform the join type indicated in the configuration of the fuzzy join agent. If the SQL query performs an inner join, each record in the joined dataset includes a string key for the reference dataset and a string key for the input dataset. Records which indicate a string key from both datasets are forthwith referred to as "joined records". For inner joins, all records of the joined datasets are joined records. In left joins, only records which indicate a string key from both datasets are joined records. Generating the joined dataset can also involve adding a column to the joined dataset which will indicate the similarity scores for each record. The values in this column can be initialized with a placeholder value or as NULL based on the SQL query. In some implementations, the overlapping abbreviations corresponding to each record in the joined dataset may also be included in the joined dataset.

Using the earlier examples, a left fuzzy join of tables with Dataset_1 specified as the left (authoritative dataset) produces the below joined dataset.

| Company_Name | Employees | Location |
| --- | --- | --- |
| Bravexel Dynamics | 50 | Seattle |
| Example Corp. | 100 | New York |
| SuperCoolCompany | 25 | — |
| Synthases Care Center | 15 | — |
| University of Miraloma | 200 | — |

In the above example datasets, because Dataset_1 is specified as the authoritative dataset, only the column "Company_Name" is included in the joined dataset. In implementations where neither dataset being joined is authoritative, the joined dataset would include the join key column for both datasets. The above examples assume the SQL query generated to generate the joined datasets above used a wildcard when selecting columns from Dataset_1 and Dataset_2 to include in the joined dataset.

At block 508, the fuzzy join agent begins to iterate over each record of the joined dataset which is a joined record. If a joined dataset corresponds to a join that was not an inner join, then the fuzzy join agent can inspect the records for null values in fields/columns of the dataset corresponding to the right dataset for a left inner join. For each joined record, operational flow continues at block 509.

At block 509, the fuzzy join agent prompts a second language model to score similarity of the string keys indicated by the joined record. As a reminder, each joined record indicates a pair of string keys with at least one overlapping abbreviation. The fuzzy join agent generates a prompt to the second language model to score the similarity (e.g., score similarity in a range of 1-10) of the string keys. The fuzzy join agent then submits the prompt to the second language model. An example prompt to generate a similarity score for the string keys indicated by the joined record is:

"Your job is to assess the similarity of a pair of {Context}. The first {Context} is '[Dataset_1 Company Name]'. The second {Context} is '[Dataset_2 C Name]' Respond with a score between 0 and 10, where 0 means very dissimilar and 10 means identical".

For the purposes of describing the operations below, the joined dataset at this block of operation is:

| Dataset_1_Company_Name | Dataset_2_C_Name | Similarity_Score |
| --- | --- | --- |
| Bravexel Dynamics | Bravexel Dynamics | 10 |
| SuperCoolCompany | Syntrelix Core Crafting | 2 |
| SuperCoolCompany | Soluntra Core Collective | 4 |
| ExampleCorp. | Ex. Corporation | 5 |
| ExampleCorp. | Example Corporation | 7 |

Although this description refers to a first language model and second language model in the context of generating abbreviations and scoring similarity of string keys, in practice, the same language model may be used to both generate abbreviations and generate similarity scores. The first language model may be a small language model which is fine-tuned to generate abbreviations for strings. The small language model may have been trained using knowledge distillation and then fine-tuned for generating abbreviations. In some cases, the fuzzy join agent may be configured to use different language models based on the context (e.g., company names) provided in the join configuration.

At block 510, the fuzzy join agent determines if there is another joined record in the joined dataset to processing for similarity scoring. If there is another joined record, then operational flow returns to block 508. If there is not another joined record to score similarity, then operational flow continues at block 511.

At block 511, the fuzzy join agent removes records of the joined dataset which do not satisfy the similarity score threshold. For example, if the similarity score threshold parameter determined in reference to block 501 is "4", then the fuzzy join agent removes all records of the joined dataset which indicate a similarity score of 6 or below. The threshold may be implemented as a "greater than" operation or "greater than or equal to" operation based on implementation. With reference to the previous example, the joined dataset after this operation is performed is:

| Dataset_1_Company_Name | Dataset_2_C_Name | Similarity_Score |
| --- | --- | --- |
| Bravexel Dynamics | Bravexel Dynamics | 10 |
| ExampleCorp. | Ex. Corps | 5 |
| ExampleCorp. | Example Corporation | 7 |

In some implementations, this operation may be performed as part of joining records/entries of the datasets. This is accomplished by adding a conditional statement to the SQL query used to join records of the dataset which results in only joining records/entries which indicate a sufficiently high similarity score. Alternatively, these operations can be performed as separate SQL queries. This assumes both datasets are in repositories compatible with SQL operations.

At block 513, the fuzzy join agent removes records of the joined dataset which indicates a reference dataset string key which matches another record in the joined dataset but has a lower similarity score. For example, the second and third entries of the string keys mapping both indicate the string key "ExampleCorp.". The second entry indicates a similarity score of "5", while the third entry indicates a similarity score of "7". Therefore, the second entry is removed from the joined dataset because it indicates a lower similarity score. This operation presumes the reference dataset is an authoritative dataset. In cases where neither dataset is authoritative, the fuzzy join agent performs the same evaluation on records of the joined dataset which indicate the same string key in the column of the joined dataset which corresponds to the string keys for the input dataset (e.g., the "Dataset_2_C_Name" column). In cases where two or more records of the joined dataset indicate the same string key and the same similarity score, the fuzzy join agent selects one of the entries to retain and removes the remaining entries. Following the above example, the joined dataset after this operation is performed is:

| Dataset_1_Company_Name | Dataset_2_C_Name | Similarity_Score |
| --- | --- | --- |
| Bravexel Dynamics | Bravexel Dynamics | 10 |
| ExampleCorp. | Example Corporation | 7 |

After removing the duplicate records, the fuzzy join agent stores the joined dataset or indicates the joined dataset to a downstream component which performs further analysis or transformations on the joined dataset.

FIG. 6 is a flowchart of example operations for verifying that abbreviation constraints were correctly applied when generating abbreviations for string keys of datasets. FIG. 6 corresponds to a case where the first language model does not generate abbreviations which satisfy the abbreviation constraints which were included in the prompt to the language model. As a reminder, abbreviation constraints refer to the parameters for the number of abbreviations a language model should generate for each string key in datasets which are being joined and the length of those abbreviations. The operations described below presume that a fuzzy join agent has received a response from the first language model after prompting the model to generate abbreviations for each string key in the reference dataset and input dataset. The operations are presented with reference to FIG. 5 by depicting operational flow from block 505 to block 605.

At block 605, the fuzzy join agent determines whether the abbreviation constraints were correctly applied to each string key in the reference dataset and input dataset. The fuzzy join agent first determines whether each string key in the reference dataset and input dataset has m abbreviations based on the corresponding parameter value indicated in the join configuration. The fuzzy join agent then determines whether each abbreviation is the correct length n. The fuzzy join agent records an indication of each string key which did not have generated abbreviations which satisfy both the abbreviation constraints. If the abbreviation constraints were not correctly applied for every string key in the datasets, then operational flow continues at block 610. If the abbreviation constraints were correctly applied for every string key in the datasets, then operational flow continues at block 507 of FIG. 5.

At block 610, the fuzzy join agent prompts the first language model to generate abbreviations for string keys in both datasets which did not have the abbreviation constraints correctly applied. The fuzzy join agent generates a prompt which includes those of the string keys which did not have abbreviations that satisfied the abbreviation constraints and submits the prompt to the first language model. The dashed line between block 610 and 605 indicates the fuzzy join agent waits for the new response from the first language model before re-checking if the abbreviation constraints were correctly applied by the first language model.

FIG. 7 is a flowchart of example operations for verifying that similarity scores were properly generated for a joined record in the joined dataset. FIG. 7 corresponds to a case where the second language model does not generate a proper similarity score for every record in the joined dataset. The operations described below presume that a fuzzy join agent has received a response from the second language model language model after prompting the model to generate a similarity score for the string keys indicated by a joined record in the joined dataset. The operations are presented with reference to FIG. 5 by depicting operational flow from block 509 to block 705.

At block 705, the fuzzy join agent determines whether the similarity scores generated by the second language model were properly generated for the joined record in the joined dataset currently being processed by the fuzzy join agent. The prompt to the second language model can specify a range of acceptable values (e.g., values between 0-1) to normalize the scores. The fuzzy join agent checks the joined record and determines whether the joined record has a similarity score and whether the similarity score is within the range of acceptable values. If the similarity scores were not correctly generated for the joined record, then operational flow continues at block 710. If the similarity scores were correctly generated for every entry in the string keys mapping, then operational flow continues at block 510.

At block 710, the fuzzy join agent prompts the second language model to score similarity of the string keys indicated by the joined record in which a similarity score was not properly generated. The dashed line between block 710 and 705 indicates the fuzzy join agent waits for the new response from the second language model before re-checking if the joined record in the joined dataset has a properly generated similarity score. Alternatively, the fuzzy join agent could perform the operations described in blocks 705 and 710 after similarity scores are generated for each joined record in the joined dataset. In that case, the fuzzy join agent would parse the joined dataset and check to make sure each joined record had proper similarity scores. The joined records which did not have proper similarity scores are recorded by the fuzzy join agent. The fuzzy join agent then generates a new prompt to the second language model to generate a similarity score for the recorded joined records. In this scenario, operational flow would proceed to block 511 based on the fuzzy join agent confirming that every joined record in the joined dataset has a properly generated similarity score.

Variations

The example illustrations describe joining records of the datasets within a relational database environment using SQL queries. In some cases, datasets may be stored in non-relational databases (e.g., DynamoDB®, MongoDB®, etc.) which do not support SQL operations natively. In these cases, the fuzzy join agent may utilize a data analysis library (e.g., the Python® "pandas" library) which provides SQL-like functionality to join records of the joined dataset. In some cases, fuzzy joining datasets which are lists of strings can be accomplished by using set operations. In this scenario, the fuzzy join agent can treat the abbreviations generated for each string in the lists of strings as sets of abbreviations. The fuzzy join agent then can compare sets of abbreviations between datasets using the intersection set operation to determine if there are any overlapping abbreviations between the sets. In some cases, the fuzzy join agent may use application-based logic to create a data structure which serves as a mapping of string keys between the datasets and combine records/entries of the datasets based on the mapping of string keys.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example but not limited to, a system, apparatus, or device, that employs one or a combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 8:
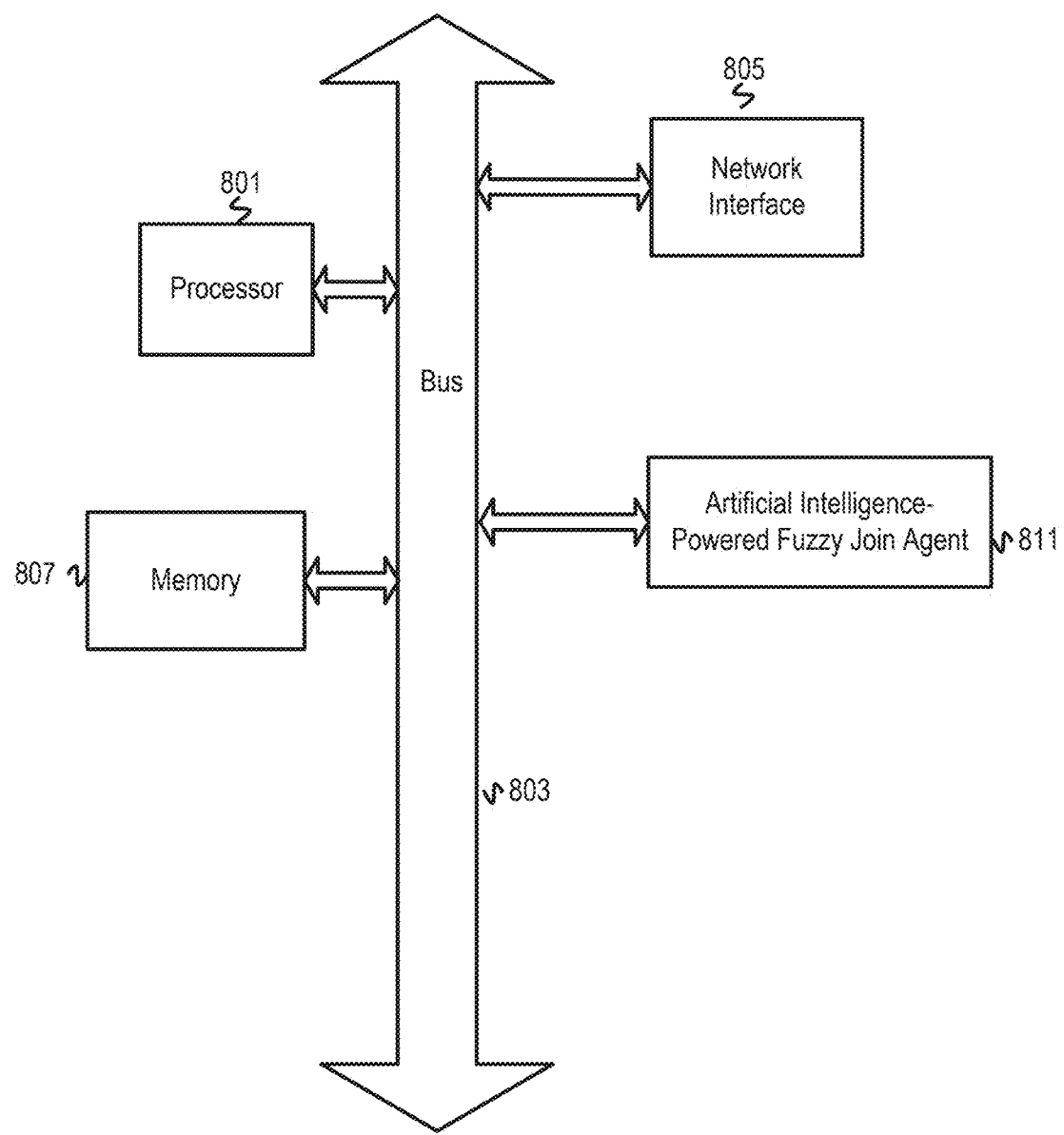
FIG. 8 depicts an example computer system with an AI-powered fuzzy join agent.

FIG. 8 depicts an example computer system with an AI-powered fuzzy join agent. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes an AI-powered fuzzy join agent ("fuzzy join agent") 811. The fuzzy join agent 811 uses a small language model to generate an abbreviated version of each string key in a first dataset and a second dataset. The fuzzy join agent 811 then joins records of the first dataset and second dataset based on identifying abbreviations of string keys between the first dataset and second dataset with at least one common abbreviation. The fuzzy join agent 811 then uses another language model (e.g., a large language model) to measure similarity of the string keys having at least one common abbreviation and then filters records/entries of the first and second dataset based on the similarity measurements or scores. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

The invention claimed is:

1. A method comprising:
   joining a first dataset and a second dataset based on fuzzy matching between strings indicated as join key values, wherein the joining comprises:
   prompting a first generative Artificial Intelligence (AI) model to generate a set of m abbreviations of length n for each string key in the first and second datasets;
   determining string keys of the first and second datasets having overlapping sets of abbreviations;
   prompting the first generative AI model or a second generative AI model to score similarity between string keys determined to have overlapping sets of abbreviations; and
   generating a joined dataset from the first and second datasets based, at least in part, on determining string keys having overlapping abbreviations and the similarity scores.

2. The method of claim 1, wherein generating the joined dataset comprises joining the first and second datasets based, at least in part, on determining string keys having overlapping abbreviations and then filtering based on the similarity scores satisfying a similarity threshold.

3. The method of claim 1, wherein filtering comprises:
   determining that a first entry of the first dataset has been joined with multiple entries in the second dataset based on the string key of the first entry having overlapping abbreviations and sufficient similarity scores with multiple string keys of the second dataset; and filtering the multiple entries on highest similarity score.

4. The method of claim 1, wherein the first generative AI model is a small language model and the second generative AI model is a large language model.

5. The method of claim 1, wherein prompting the first generative AI model to generate abbreviations comprises generating a prompt with context for the string keys of the first and second datasets.

6. The method of claim 1 further comprising tuning the m and n based on, at least one of an initial attempt to join the first and second datasets and experiments in abbreviation generation of different types of strings.

7. The method of claim 1, wherein prompting the first generative AI model to generate a set of m abbreviations of length n for each string key in the first and second datasets comprises repeatedly prompting the first generative AI model to generate the abbreviations until each string key has m abbreviations of length n.

8. A non-transitory, machine-readable medium having program code stored thereon, the program code comprising instructions to:

generate a first prompt for a generative Artificial Intelligence (AI) model to generate a set of m abbreviations of length n for each string indicated as a join key value in first and second datasets and submit the generated first prompt to a first generative AI model;

match string keys of the first and second datasets based on overlap of the abbreviations;

generate one or more second prompts for a generative AI model to score similarity between string keys matched based on overlap of abbreviations and submit the one or more second prompts to the first generative AI model or another generative AI model; and generate a combination of the first and second datasets based, at least in part, on the similarity scores.

9. The non-transitory, machine-readable medium of claim 8, wherein the instructions to match string keys of the first and second datasets based on overlap of the abbreviations comprise instructions to join the first and second datasets based on minimum overlapping between sets of abbreviations of string keys.

10. The non-transitory, machine-readable medium of claim 9, wherein the program code further comprises instructions to add to the first dataset the abbreviations generated for the string keys of the first dataset and add to the second dataset the abbreviations generated for the string keys of the second dataset.

11. The non-transitory, machine-readable medium of claim 9, wherein the instructions to generate the combination of the first and second datasets comprise instructions to filter the join of the first and second dataset based on similarity scores satisfying a similarity threshold.

12. The non-transitory, machine-readable medium of claim 8, wherein instructions to generate the combination of the first and second datasets comprise instructions to:

determine whether multiple entries in a preliminary combination of the first and second datasets correspond to a string key of the first dataset being matched with multiple string keys of the second dataset based on overlap of abbreviations and having sufficient similarity scores; and filter the multiple entries based on highest similarity score of the multiple entries.

13. The non-transitory, machine-readable medium of claim 8, wherein instructions to generate the first prompt comprise instructions to generate the first prompt with context for the string keys of the first and second datasets.

14. The non-transitory, machine-readable medium of claim 8, wherein instructions to generate and submit the first prompt comprise instructions to repeatedly submit the first prompt to the first generative AI model to generate the abbreviations, at least for those of the string keys that do not have m abbreviations of length n, until each string key has m abbreviations of length n.

15. The non-transitory, machine-readable medium of claim 8, wherein the instructions to generate one or more second prompts for a generative AI model to score similarity between fuzzy matched string keys comprise instructions to generate a second prompt for each pairing of string keys matched based on overlapping abbreviations.

16. An apparatus comprising:

a processor; and a machine-readable medium having instructions stored thereon, the instructions executable by the processor to cause the apparatus to, generate a first prompt for a generative Artificial Intelligence (AI) model to generate a set of m abbreviations of length n for each string indicated as a join key value in a first and second datasets and submit the generated first prompt to a first generative AI model;

match string keys of the first and second datasets based on overlap of the abbreviations;

generate one or more second prompts for a generative AI model to score similarity between string keys matched based on overlap of abbreviations and submit the one or more second prompts to the first generative AI model or another generative AI model; and generate a combination of the first and second datasets based, at least in part, on the similarity scores.

17. The apparatus of claim 16, wherein the instructions to match string keys comprise instructions executable by the processor to cause the apparatus to join the first and second datasets based on having overlapping between sets of abbreviations of string keys between datasets.

18. The apparatus of claim 16, wherein the instructions to generate the combination of the first and second datasets comprise instructions executable by the processor to cause the apparatus to filter the join of the first and the second dataset based on similarity scores satisfying a similarity threshold.

19. The apparatus of claim 16, wherein instructions to generate the combination of the first and second datasets comprise instructions executable by the processor to cause the apparatus to:

determine whether multiple entries in a preliminary combination of the first and second datasets correspond to a string key of the first dataset being matched with multiple string keys of the second dataset based on overlap of abbreviations and having sufficient similarity scores; and filter the multiple entries based on a highest similarity score of the multiple entries.

20. The apparatus of claim 16, wherein instructions to generate and submit the first prompt comprise instructions executable by the processor to cause the apparatus to repeatedly submit the first prompt to the first generative AI model to generate the abbreviations, at least for those of the string keys that do not have m abbreviations of length n, until each string key has m abbreviations of length n.

21. The apparatus of claim 16, wherein the instructions to generate one or more second prompts for a generative AI model to score similarity between fuzzy matched string keys comprise instructions executable by the processor to cause the apparatus to generate a second prompt for each pairing of string keys matched based on overlapping abbreviations.

* * * * *